United States Patent
Ku et al.

(10) Patent No.: US 10,548,017 B2
(45) Date of Patent: Jan. 28, 2020

(54) METHOD AND APPARATUS FOR TERMINAL PERFORMING REDISTRIBUTION TARGET SELECTION

(71) Applicant: LG ELECTRONICS INC., Seoul (KR)

(72) Inventors: Gwanmo Ku, Seoul (KR); Youngdae Lee, Seoul (KR); Sunghoon Jung, Seoul (KR); Jaewook Lee, Seoul (KR); Sangwon Kim, Seoul (KR); Sangwook Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/069,478

(22) PCT Filed: Dec. 5, 2016

(86) PCT No.: PCT/KR2016/014180
§ 371 (c)(1),
(2) Date: Jul. 11, 2018

(87) PCT Pub. No.: WO2017/135558
PCT Pub. Date: Aug. 10, 2017

(65) Prior Publication Data
US 2019/0021009 A1 Jan. 17, 2019

Related U.S. Application Data

(60) Provisional application No. 62/290,476, filed on Feb. 3, 2016.

(51) Int. Cl.
*H04W 16/04* (2009.01)
*H04W 28/08* (2009.01)
(Continued)

(52) U.S. Cl.
CPC .......... *H04W 16/04* (2013.01); *H04W 28/08* (2013.01); *H04W 48/20* (2013.01); *H04W 16/32* (2013.01)

(58) Field of Classification Search
CPC ..... H04W 16/04; H04W 16/32; H04W 28/08; H04W 48/04; H04W 48/10; H04W 48/20
See application file for complete search history.

(56) References Cited

U.S. PATENT DOCUMENTS

| 2014/0004862 A1 | 1/2014 | Ekemark |
| 2015/0230141 A1 | 8/2015 | Zou et al. |
| 2018/0352508 A1* | 12/2018 | Fujishiro ............... H04W 76/30 |

FOREIGN PATENT DOCUMENTS

| KR | 10-2013-0053378 A | 5/2013 |
| WO | 2015/069064 A1 | 5/2015 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 13)", 3GPP TS 36.304 V13.0.0 (Dec. 2015), See sections 5.2.4.10.1, 5.2.7, 7.3.

(Continued)

*Primary Examiner* — Khoa Huynh
(74) *Attorney, Agent, or Firm* — Dentons US LLP

(57) ABSTRACT

A method for a terminal performing redistribution target selection in a wireless communication system, and an apparatus supporting the same are provided. The terminal receives redistribution parameters from a network, and performs redistribution target selection based on UE_ID, wherein the UE_ID can be a function of a time varying index and a UE identity.

6 Claims, 13 Drawing Sheets

(51) Int. Cl.
*H04W 48/20* (2009.01)
*H04W 16/32* (2009.01)

(56) References Cited

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 13)", 3GPP TS 36.304 V13.1.0 (Mar. 2016).

* cited by examiner

METHOD AND APPARATUS FOR TERMINAL PERFORMING REDISTRIBUTION TARGET SELECTION

CROSS-REFERENCE TO RELATED APPLICATIONS

This application is the National Stage filing under 35 U.S.C. 371 of International Application No. PCT/KR2016/014180, filed on Dec. 5, 2016, which claims the benefit of U.S. Provisional Application No. 62/290,476 filed on Feb. 3, 2016, the contents of which are all hereby incorporated by reference herein in their entirety.

BACKGROUND OF THE INVENTION

Field of the Invention

The present invention relates to a wireless communication system, and more particularly, to a method of performing redistribution target selection by a user equipment (UE), and an apparatus supporting the method.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Cellular is concept proposed to overcome a restriction of a service region and a limitation of a frequency and subscriber capacity. This is a method of providing communication coverage by changing single high-power base station to a plurality of low-power base stations. That is, a mobile communication service region is divided in unit of several small cells so that different frequencies are assigned to adjacent cells, and two cells which are sufficiently spaced apart from each other and thus have no interference occurrence use the same frequency band to spatially reuse a frequency.

Meanwhile, there may be a particularly high communication demand in a specific region such as a hotspot inside a cell, and reception sensitivity of radio waves may deteriorate in a specific region such as a cell edge or a coverage hole. With the advance of a wireless communication technique, a small cell may be installed inside a macrocell for the purpose of enabling communication in the hotspot, the cell edge, and the coverage hole. A pico cell, a femto cell, a microcell, or the like is a type of the small cell. The small cell may be located inside or outside the macrocell. In this case, the small cell may be located at a position where the macrocell does not reach, or may be located indoors or at the office. Such a network may be called a heterogeneous network (HetNet). In this case, the heterogeneous network does not have to use different radio access mechanisms. In a heterogeneous network environment, the macrocell is a relatively large coverage cell, and the small cell such as the femtocell and the picocell is a small coverage cell. The macrocell and the small cell may serve to distribute the same traffic or transmit traffic of different QoS. In the heterogeneous network environment, coverage overlapping may occur between the plurality of macrocells and small cells.

SUMMARY OF THE INVENTION

When load balancing is performed based on UE-ID calculated using 'IMSI mod 100', it may be difficult to fairly redistribute specific UEs among a plurality of carriers. For example, a UE fulfilling 'UE_ID≤100*redistrRange[0]' may always choose a serving cell or a serving frequency, and may not be redistributed to other cells or other frequencies. Therefore, there is a need to propose a method of performing redistribution target selection by the UE.

According to an embodiment, provided is a method of performing redistribution target selection by a UE in a wireless communication system. The UE may receive redistribution parameters from a network, and perform the redistribution target selection on the basis of a UE_ID. The UE_ID may be a function of a time varying index and a user identity (or UE identity).

The time varying index may be any one of SFN (System Frame Numbers) and HSFN (Hyper SFN).

The user identity may be any one of IMSI (International Mobile Subscriber Identity), C-RNTI (Cell Radio Network Temporary Identifier), and S-TMSI (System Architecture Evolution (SAE) Temporary Mobile Subscriber Identity). The SFN may indicate a system frame number when a redistribution procedure is triggered.

The UE_ID may be defined by: UE_ID=(a*time varying index+b*user identity+c) mod 100, where a, b, and c are any constants.

The UE_ID may be defined by: UE_ID=[(a*time varying index+b*user identity+c) mod 100]+d, where a, b, c, and d are any constants.

The redistribution target selection may be performed when a redistribution procedure is triggered.

The redistribution parameter may include a redistribution factor of a serving frequency and a neighboring frequency.

The UE may be in a state of an RRC_IDLE mode.

According to another embodiment, there is provided a UE for performing redistribution target selection in a wireless communication system. The UE may include: a memory; a transceiver, and a processor operatively coupled to the memory and the transceiver. The processor may be configured to: control the transceiver to receive redistribution parameters from a network; and perform the redistribution target selection on the basis of a UE_ID. The UE_ID may be a function of a time varying index and a user identity (or UE identity).

Load balancing can be effectively achieved.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
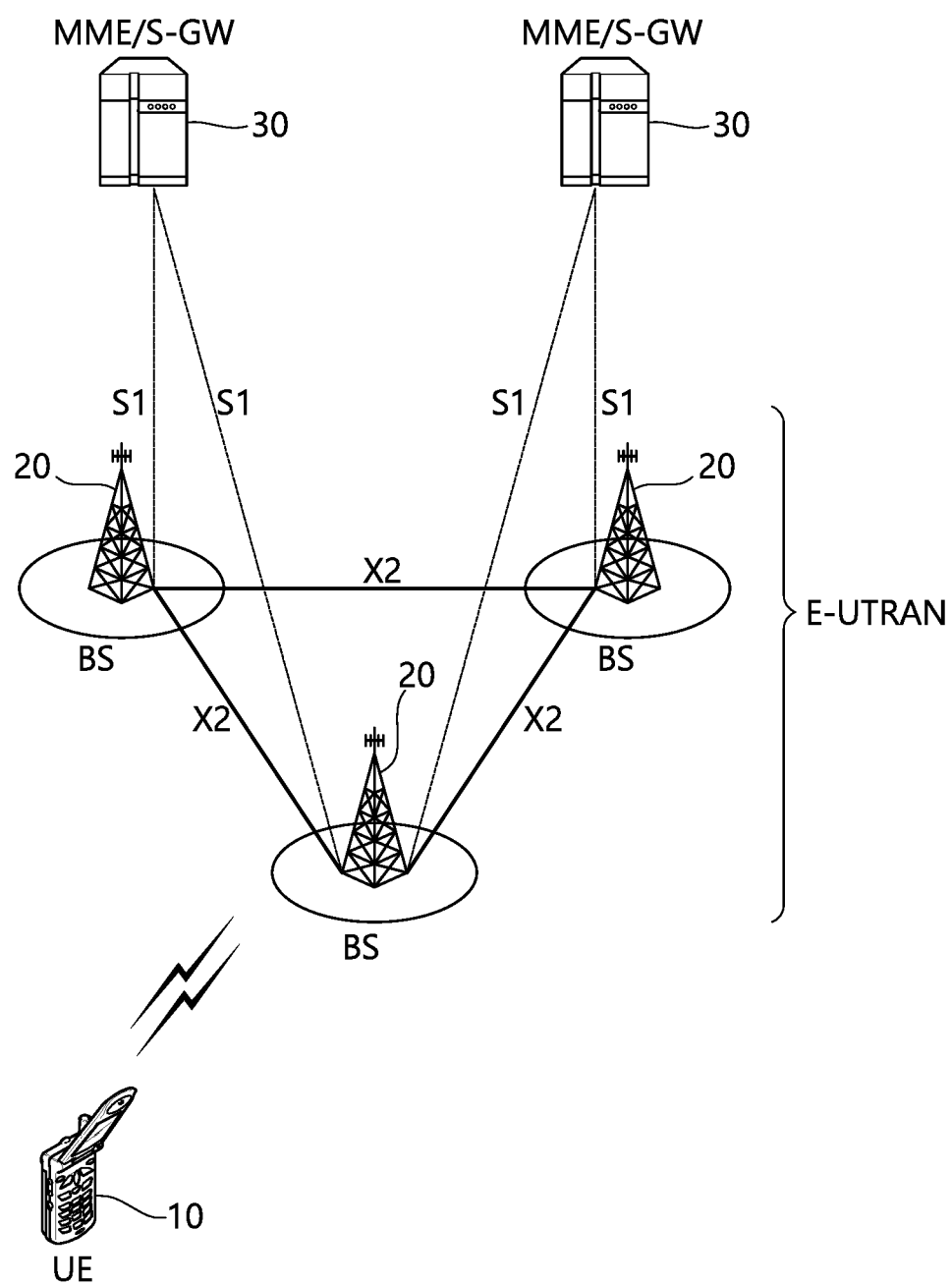
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
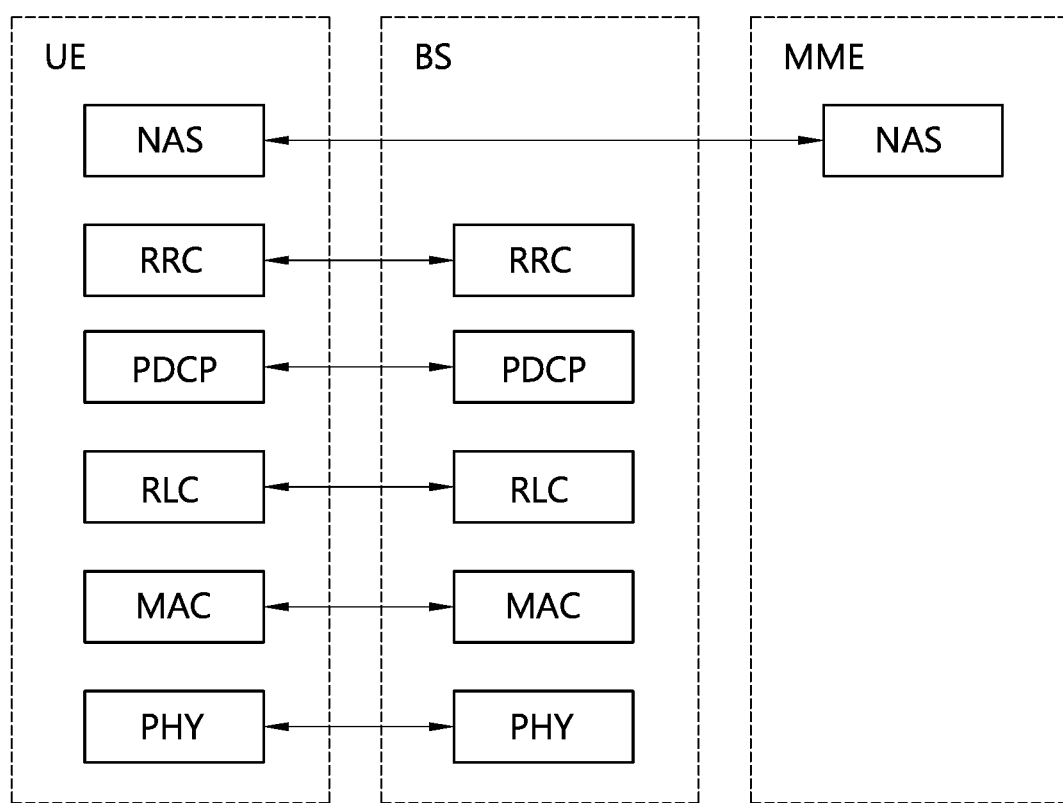
FIG. 2 shows a control plane of a radio interface protocol of an LTE system.
Figure 3:
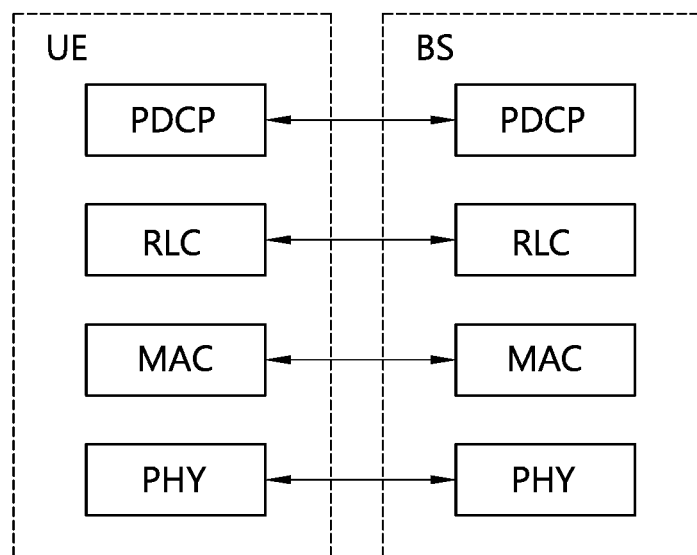
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC State of a UE and RRC Connection Procedure are Described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
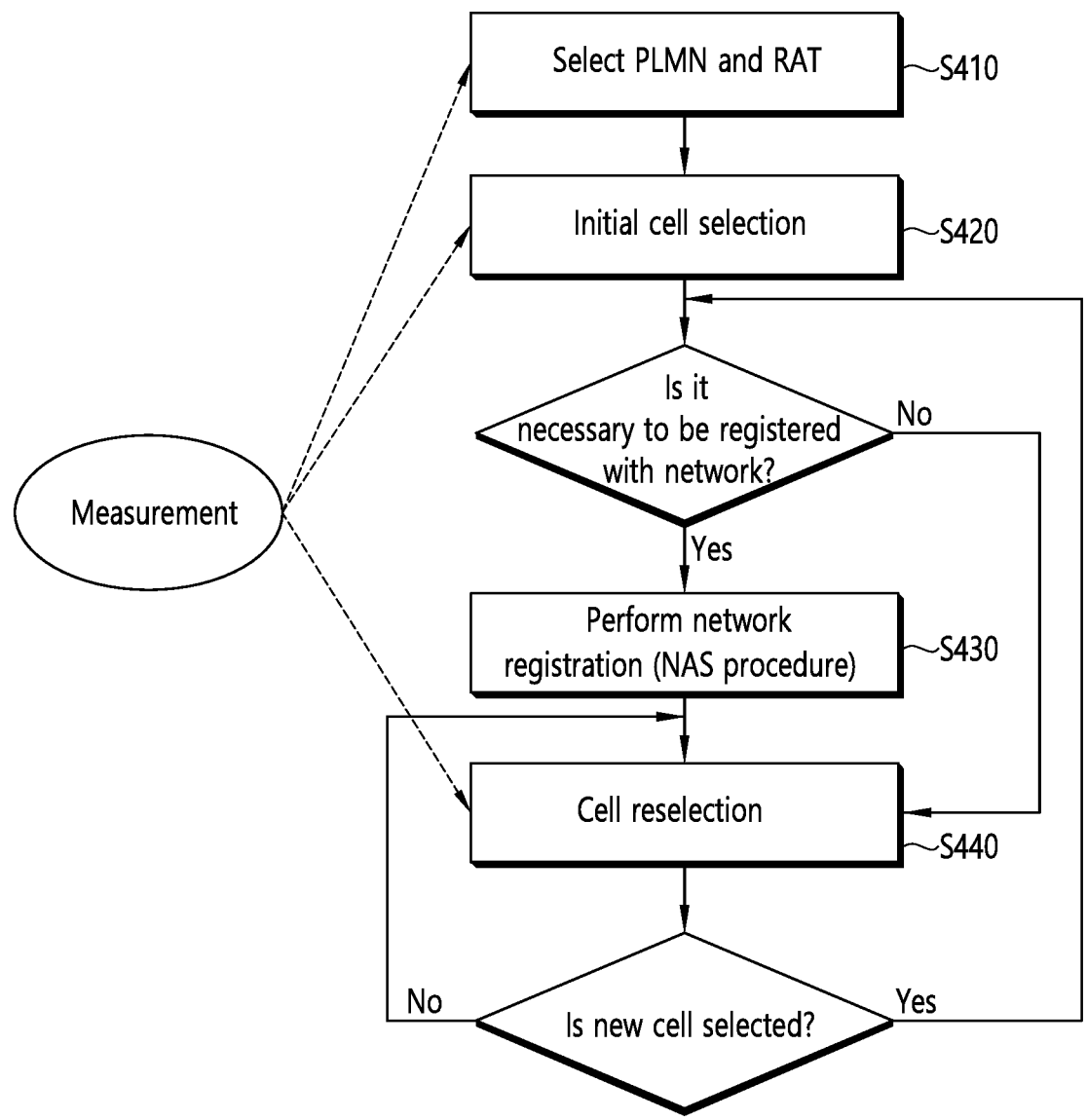
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Hereinafter, a Method and a Procedure of Selecting a Cell by a UE in a 3GPP LTE is Described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: A UE reselects a cell having a different center frequency from that of RAT, such as a cell on which the UE camps on Inter-RAT cell reselection: A UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured a UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each UE set by a network may refer to a dedicated priority. If receiving the dedicated priority, the UE may receive a valid time associated with the dedicated priority together. If receiving the dedicated priority, the UE starts a validity timer set as the received valid time together therewith. While the valid timer is operated, the UE applies the dedicated priority in the RRC idle mode. If the valid timer is expired, the UE discards the dedicated priority and again applies the common priority.

For the inter-frequency cell reselection, a network may provide a UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide a UE with a cell reselection black list used in cell reselection. The UE does not perform cell reselection on a cell included in the black list.

Ranking Performed in a Cell Reselection Evaluation Process is Described Below.

A ranking criterion used to apply priority to a cell is defined as in Equation 1.

$$R_S = Q_{meas,s} + Q_{hyst}, R_n = Q_{meas,n} - Q_{offset} \quad \text{[Equation 1]}$$

In this case, Rs is the ranking criterion of a serving cell, Rn is the ranking criterion of a neighbor cell, Qmeas,s is the quality value of the serving cell measured by a UE, Qmeas,n is the quality value of the neighbor cell measured by UE, Qhyst is the hysteresis value for ranking, and Qoffset is an offset between the two cells.

In Intra-frequency, if a UE receives an offset "Qoffsets,n" between a serving cell and a neighbor cell, Qoffset=Qoffsets,n. If a UE does not Qoffsets,n, Qoffset=0.

In Inter-frequency, if a UE receives an offset "Qoffsets,n" for a corresponding cell, Qoffset=Qoffsets,n+Qfrequency. If a UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and a UE may alternately reselect the twos. Qhyst is a parameter that gives hysteresis to cell reselection so that UE is prevented from to alternately reselecting two cells.

A UE measures RS of a serving cell and Rn of a neighbor cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Hereinafter, a Cell Selection Criterion S Will be Described.

A UE may calculate the ranking of any cell satisfying a cell selection criterion S. The cell selection criterion may be defined by Equation 2.

$$Srxlev>0 \text{ and } Squal>0 \quad \text{[Equation 2]}$$

Srxlev denotes a cell selection RX level value (dB), which may be defined by Equation 3. Squal denotes a cell selection quality value (dB), which may be defined by Equation 4.

$$Srxlev = Qrxlevmeas - (Qrxlevmin + Qrxlevminoffset) - Pcompensation - Qoffsettemp \quad \text{[Equation 3]}$$

Qrxlevmeas denotes a downlink reception power value used when the UE actually measures an RX channel, Qrxlevmin denotes a minimum downlink receiver power requirement level required to select a corresponding cell, Qrxlevminoffset denotes a threshold value to be added to Qrxlevmin only when the UE periodically searches for a public land mobile network (PLMN, or a communication vendor) having a higher priority while being present in a visited public land mobile network (VPLMN), Pcompensation is a threshold value considering an uplink channel state, and Qoffsettemp is an offset temporarily applied to the cell.

$$Squal = Qqualmeas - (Qqualmin + Qqualminoffset) - Qoffsettemp \quad \text{[Equation 4]}$$

Qqualmeas denotes a value obtained by calculating a ratio of received signal strength used when the UE actually measures a downlink RX channel and total noise actually measured. Qqualmin a minimum signal to noise ratio level required to select a corresponding cell. Qqualminoffset denotes a threshold value to be added to Qqualmin only when the UE periodically searches for a PLMN having a higher priority while being present in a VPLMN, and Qoffsettemp is an offset temporarily applied to the cell.

Referring to Equation 2 above, the cell selection criterion may be satisfied when both of Srxlev and Squal are greater than 0. That is, when both of the RSRP and RSRQ of the measured cell are greater than or equal to a specific level, the UE may determine the cell as a cell having a basic possibility for cell reselection. In particular, Squal is a parameter corresponding to the RSRQ. That is, Squal is a value calculated in association with quality of power rather than simply a value associated with a magnitude of power measured in the cell. The cell selection criterion may be satisfied in terms of quality of the cell if Squal>0. The cell selection criterion for the RSRQ may be satisfied only when the measured RSRQ is greater than or equal to a sum of Qqualmin and Qqualminoffset.

Figure 5:
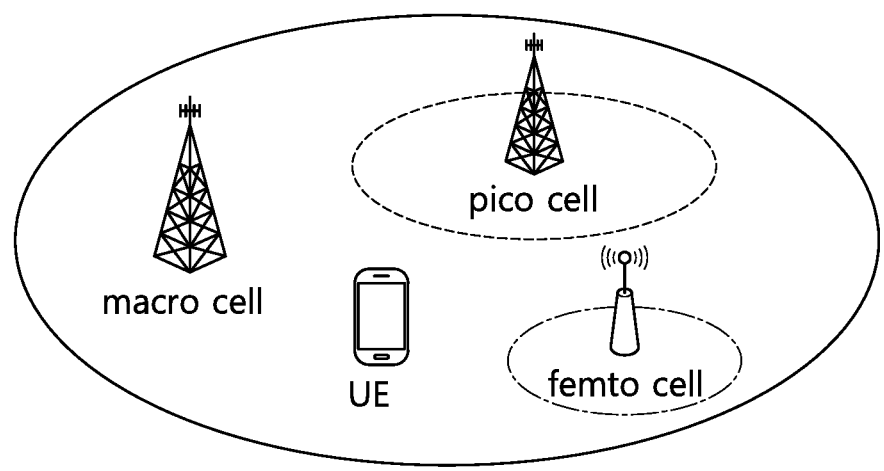
FIG. 5 illustrates an example of a heterogeneous network.

FIG. 5 illustrates an example of a heterogeneous network (HetNet).

Referring to FIG. 5, the heterogeneous network is a network in which different types of cells are mixed and operated. There are many nodes overlapping in the heterogeneous network, which may include a picocell, a microcell, a femtocell or a home BS (eNB). Although the use of small cells is not limited, a picocell may generally be installed in an area with high demand for data services, a femtocell may be installed in an indoor office or home, and a wireless repeater may be installed for supplementing macrocell coverage. Small cells may be classified into a closed subscriber group (CSG) available only to a particular user according to access restriction, an open access group that general users are allowed to access, and a hybrid access group that is a combination of these two types.

Hereinafter, a Method of Distributing Loads in a Heterogeneous Network Environment Will be Described.

A plurality of frequencies may be deployed in the heterogeneous network. For example, macro cells having different frequencies may be deployed in an overlapping manner, and small cells having different frequencies may be deployed in the macro cells in an overlapping manner. When the plurality of frequencies are deployed in the heterogeneous network, for redistribution of a UE in an RRC_IDEL mode, a network may broadcast a redistribution factor. The redistribution factor may be a redistribution probability which is set per frequency. Alternatively, the redistribution factor may be a redistribution probability which is set per cell. A redistribution range may be calculated based on the redistribution factor. The redistribution range may be defined by Equation 5 below.

$$redistrRange[i] = \frac{redistrFactor[i]}{\sum_{j=0}^{j=(maxCandidates-1)} redistrFactor[j]}$$ [Equation 5]

maxCandidates may be the total number of frequencies with valid redistFactor[j]. Alternatively, maxCandidates may be the total number of cells with valid redistFactor[j].

Thereafter, the UE may perform cell re-selection on a cell corresponding to the redistribution range on the basis of the UE_ID. The UE_ID may be 'MSI mod 100'. That is, the UE_ID may be a remainder obtained by dividing the IMSI (International Mobile Subscriber Identity) by 100. The IMSI is a unique ID capable of identifying a mobile communication subscriber globally. The IMSI may consist of a PLMN ID and an MSIN. The PLMN ID is an ID capable of identifying a communication operator globally, and the MSIN is a unique ID capable of identifying a subscriber in a corresponding communication operator.

If the UE_ID satisfies Equation 6, the UE may choose a frequency or cell corresponding to redistrFactor[0] as a redistribution target of the UE. The frequency or cell corresponding to the redistrFactor[0] may be a serving frequency or a serving cell. Therefore, the UE may choose the serving frequency or the serving cell as the redistribution target of the UE.

UE_ID≤100*redistrRange[0] [Equation 6]

If the UE_ID satisfies Equation 7, the UE may choose a frequency or cell corresponding to redistrFactor[i] as a redistribution target of the UE. The frequency or cell corresponding to the redistrFactor[i] may be a neighbouring frequency or a neighbouring cell. Therefore, the UE may choose the neighbouring frequency or the neighbouring cell as the redistribution target of the UE.

$$100*\Sigma_{j=0}^{j=i-1}redistrRange[j]$$
$$<UE\_ID\leq100*\Sigma_{j=0}^{j=i}redistrRange[j],$$ [Equation 7]

If load balancing is performed based on a UE_ID which is set to 'IMSI mode 100', it may be difficult to fairly redistribute UEs among a plurality of carriers. Since a redistribution factor of a serving frequency or a serving cell is always located in a first entry of the redistribution factor (that is, since a frequency or cell corresponding to redistrRange[0] is a serving frequency or a serving cell), a specific UE may not be fairly redistributed among a plurality of carriers. For example, a UE fulfilling 'UE_ID≤100*redistrRange[0]' may always choose a serving cell or a serving frequency, and may not be redistributed to other cells or other frequencies. Therefore, there is a need to propose a method of performing redistribution target selection by the UE. Hereinafter, a method of performing redistribution target selection by a UE and an apparatus supporting the method will be described according to an embodiment of the present invention.

In order to fairly redistribute UEs among one or more carriers, a UE_ID may be defined by a new function instead of 'IMSI mod 100'. The UE_ID may be defined based on at least any one of a time varying index, a UE identity, and a constant value.

The UE_ID may be defined by '(a*v_t+b*v_id+c) mod 100'. That is, the UE_ID may be defined by a remainder obtained by dividing (a*v_t+b*v_id+c) by 100. a, b, and c may be constants, v_t may be a time varying index, and v_id may be a user identity. For example, the user identity may be IMSI, C-RNTI (Cell Radio Network Temporary Identifier), S-TMSI (System Architecture Evolution (SAE) Temporary Mobile Subscriber Identity), or the like. For example, the time varying index may be SFN (System Frame Numbers), HSFN (Hyper SFN), or the like. The SFN may indicate a system frame number when a redistribution procedure is triggered. The constant may be 0.

For example, if b is 0, the UE_ID may be calculated through '(a*v_t+c) mod 100'. For example, if a and c are 0, the UE_ID may be calculated through '(b*v_id) mod 100'. For example, if a is 0, the UE_ID may be calculated through '(b*v_id+c) mod 100'.

(2) The UE_ID may be defined by '[(a*v_t+b*v_id+c) mod 100]+d'. That is, the UE_ID may be defined as a value obtained by adding d to a remainder obtained by dividing (a*v_t+b*v_id+c) by 100. a, b, and c may be constants, v_t may be a time varying index, and v_id may be a user identity. For example, the user identity may be IMSI, C-RNTI, S-TMSI, or the like. For example, the time varying index may be SFN, HSFN, or the like. The SFN may indicate a system frame number when a redistribution procedure is triggered. The constant may be 0.

For example, if b is 0, the UE_ID may be calculated through '[(a*v_t+c) mod 100]+d'. For example, if a and c are 0, the UE_ID may be calculated through '[(b*v_id) mod 100]+d'. For example, if a and d are 0, the UE_ID may be calculated through '(b*v_id+c) mod 100'.

Figure 6:
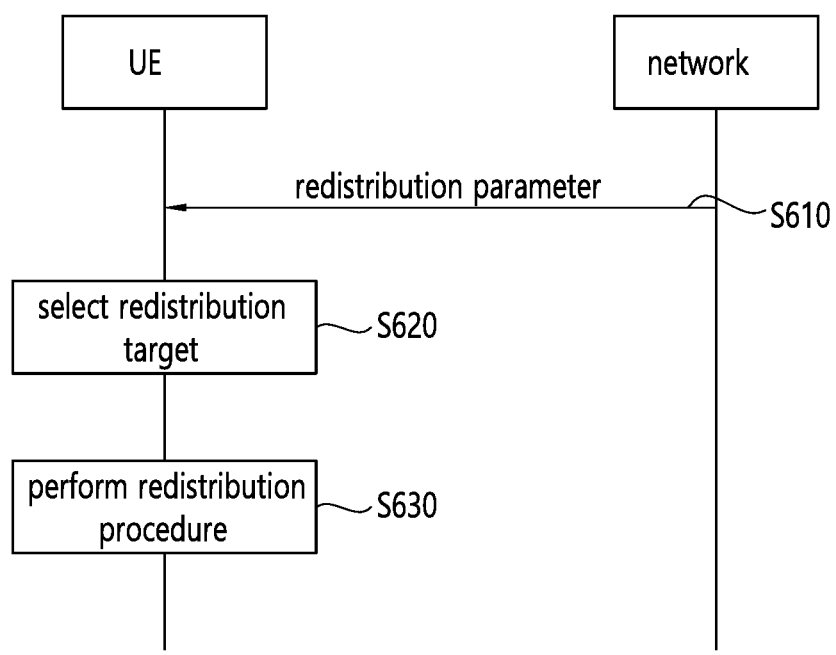
FIG. 6 shows a procedure of choosing a UE_ID by a UE according to an embodiment of the present invention.

FIG. 6 shows a procedure of choosing a UE_ID by a UE according to an embodiment of the present invention.

Referring to FIG. 6, in step S610, a network may broadcast a redistribution parameter. The redistribution parameter may be included in a system information block. The system information block may be SIB3, and redistributionServingInfo may be included in the SIB3. The redistributionServingInfo may be redistribution parameter information for a serving cell. The system information block may be SIB5, and redistributionInterFreqInfo may be included in the SIB5. The redistributionInterFreqInfo may be redistribution parameter information for an inter-frequency.

In step S620, when a redistribution procedure is triggered, the UE may perform redistribution target selection. For the redistribution target selection, the UE may compile a sorted list of a redistribution target. A procedure in which the UE compiles the sorted list of the redistribution target is specified in 3GPP TS 36.304 V13.0.0 as shown in Table 1. The procedure in which the UE compiles the sorted list of the redistribution target is specified in 3GPP TS 36.304 V13.1.0 as shown in Table 2.

TABLE 1

5.2.4.10.1 Redistribution target selection

The UE shall compile a sorted list of valid redistFactor[j] in which entries are added in increasing index order starting with index 0 as follows:
the value of the redistributionFactorServing from SystemInformationBlockType3;
for each entry in InterFreqCarrierFreqList and subsequent for each entry in InterFreqCarrierFreqListExt:
if present in RedistributionInterFreqInfo: the value of the entry in redistributionNeighCellList corresponding to the cell ranked as the best cell among the cells on this frequency meeting the criteria according to section 5.2.4.6;
else the value of the entry in redistributionFactorFreq corresponding to the frequency if at least one detected cell on the frequency fulfills the cell selection criterion S defined in 5.2.3.2;

TABLE 2

5.2.4.10.1 Redistribution target selection

The UE shall compile a sorted list of one or more candidate redistribution targets, and for each candidate entry [j] a valid redistrFactor[j],
in which entries are added in increasing index order starting with index 0 as follows:
for the serving frequency (redistributionFactorServing is included in SystemInformationBlockType3 whenever redistribution is configured):
the serving cell if redistributionFactorCell is included;
otherwise the serving frequency;
In both cases, redistrFactor[0] is set to redistributionFactorServing;
for each entry in InterFreqCarrierFreqList and subsequent for each entry in InterFreqCarrierFreqListExt:
the cell ranked as the best cell on this frequency according to section 5.2.4.6 if redistributionNeighCellList is configured and includes this cell; otherwise, the concerned frequency if redistributionFactorFreq is configured and if at least one cell on the frequency fulfills the cell selection criterion S defined in 5.2.3.2;
If the cell is included, redistrFactor[j] is set to the corresponding redistributionFactorCell; If the frequency is included, redistrFactor[j] is set to the corresponding redistributionFactorFreq;

In step S620, the UE may choose the redistribution target as follows.

If '$UE\_ID \leq 100*redistrRange[0]$', the UE may choose a frequency or cell corresponding to redistrFactor[0] as a redistribution target of the UE. The frequency or cell corresponding to the redistrFactor[0] may be a serving frequency or a serving cell. Therefore, the UE may choose the serving frequency or the serving cell as the redistribution target of the UE.

If '$100*\Sigma_{j=0}^{j=i-1} redistrRange[j] < UE\_ID \leq 100* \Sigma_{j=0}^{j=i} redistrRange[j]$', the UE may choose a frequency or cell corresponding to a redistrFactor[i] as a redistribution target of the UE. The frequency or cell corresponding to the redistrFactor[i] may be a neighbouring frequency or a neighbouring cell. Therefore, the UE may choose the neighbouring frequency or the neighbouring cell as the redistribution target of the UE.

The redistrRange[i] of the frequency or the cell may be defined as follows.

$$redistrRange[i] = \frac{redistrFactor[i]}{\sum_{i=0}^{j=(maxCandidates-1)} redistrFactor[j]}$$

maxCandidates may be the total number of frequencies with valid redistFactor[j]. Alternatively, maxCandidates may be the total number of cells with valid redistFactor[j].

In order to fairly distribute UEs among one or more carriers, a UE_ID may be defined based on at least any one of a time varying index, a UE identity, and a constant value.

The UE_ID may be defined by '$(a*v\_t+b*v\_id+c) \bmod 100$'. That is, the UE_ID may be defined by a value obtained by dividing $(a*v\_t+b*v\_id+c)$ by 100. a, b, and c may be constants, v_t may be a time varying index, and v_id may be a user identity. For example, the user identity may be IMSI, C-RNTI (Cell Radio Network Temporary Identifier), S-TMSI (System Architecture Evolution (SAE) Temporary Mobile Subscriber Identity), or the like. For example, the time varying index may be SFN (System Frame Numbers), HSFN (Hyper SFN), or the like. The SFN may indicate a system frame number when a redistribution procedure is triggered. The constant may be 0.

The UE_ID may be defined by '$[(a*v\_t+b*v\_id+c) \bmod 100]+d$'. That is, the UE_ID may be defined as a value obtained by adding d to a remainder obtained by dividing $(a*v\_t+b*v\_id+c)$ by 100. a, b, and c may be constants, v_t may be a time varying index, and v_id may be a user identity. For example, the user identity may be IMSI, C-RNTI, S-TMSI, or the like. For example, the time varying index may be SFN, HSFN, or the like. The SFN may indicate a system frame number when a redistribution procedure is triggered. The constant may be 0.

In step S630, the UE may perform the redistribution procedure. The redistribution procedure may be specified in 3GPP TS 36.304 V13.1.0 as shown in Table 3.

TABLE 3

5.2.4.10 E-UTRAN Inter-frequency Redistribution procedure

If a UE is redistribution capable and redistributionServingInfo is included in SystemInformationBlockType3 and redistributionInterFreqInfo is included in SystemInformationBlockType5 and the UE is not configured with dedicated priorities and if T360 is not running and if redistrOnPagingOnly is not present in SystemInformationBlockType3: or
if T360 expires: or
if Paging message is received and the redistributionIndication is included:
Perform inter-frequency measurement as specified in 5.2.4.2;
Once measurement results are available perform redistribution target selection as specified in 5.2.4.10.1;
Start T360;
The UE shall stop T360 and cease to consider a frequency or cell to be redistribution target when:
the UE enters RRC_CONNECTED state; or
T360 expires; or
if Paging message is received and the redistributionIndication is included while T360 is running; or
the UE reselects a cell not belonging to redistribution target.

Figure 7A:
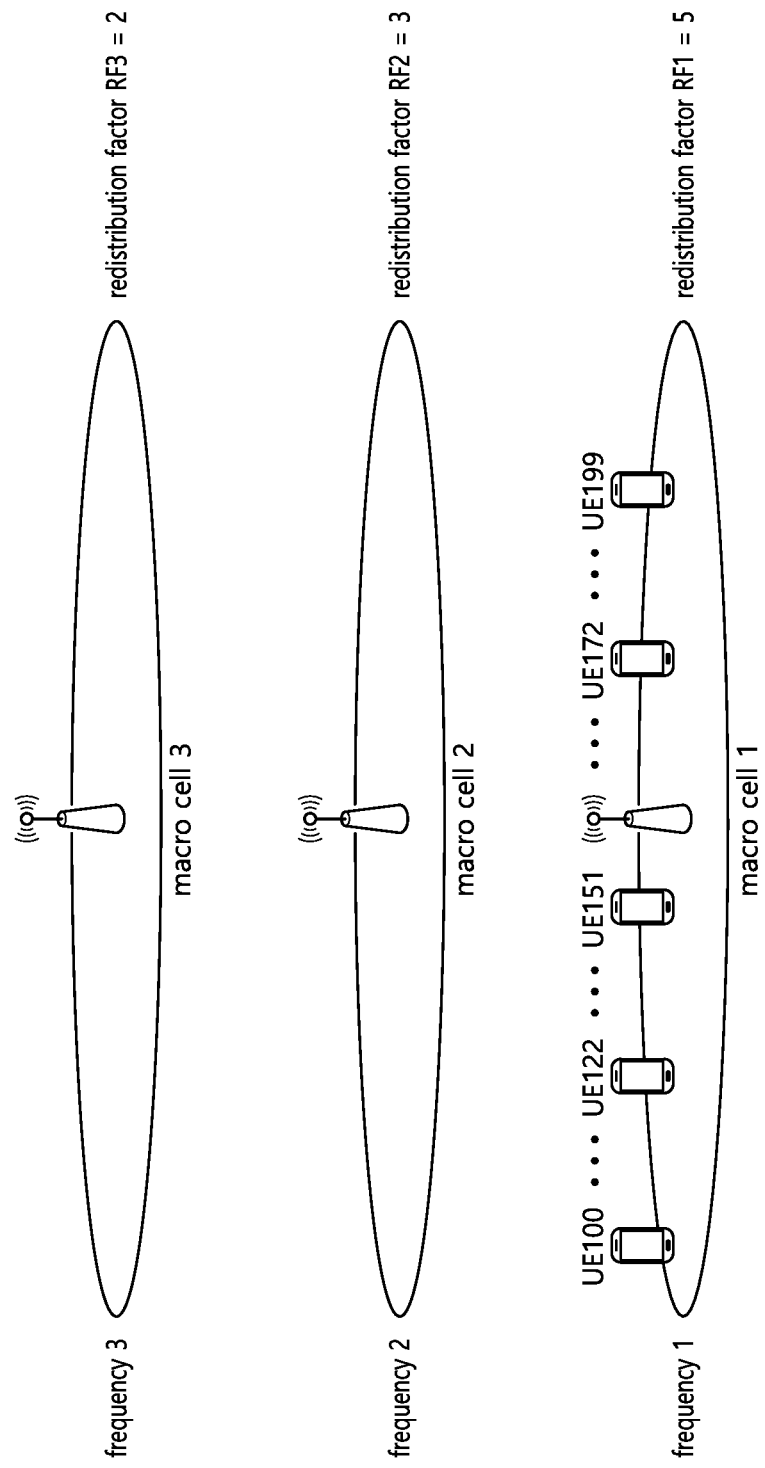
FIG. 7A to FIG. 7C show examples in which a UE performs redistribution based on a newly defined UE_ID according to an embodiment of the present invention.
Figure 7B:
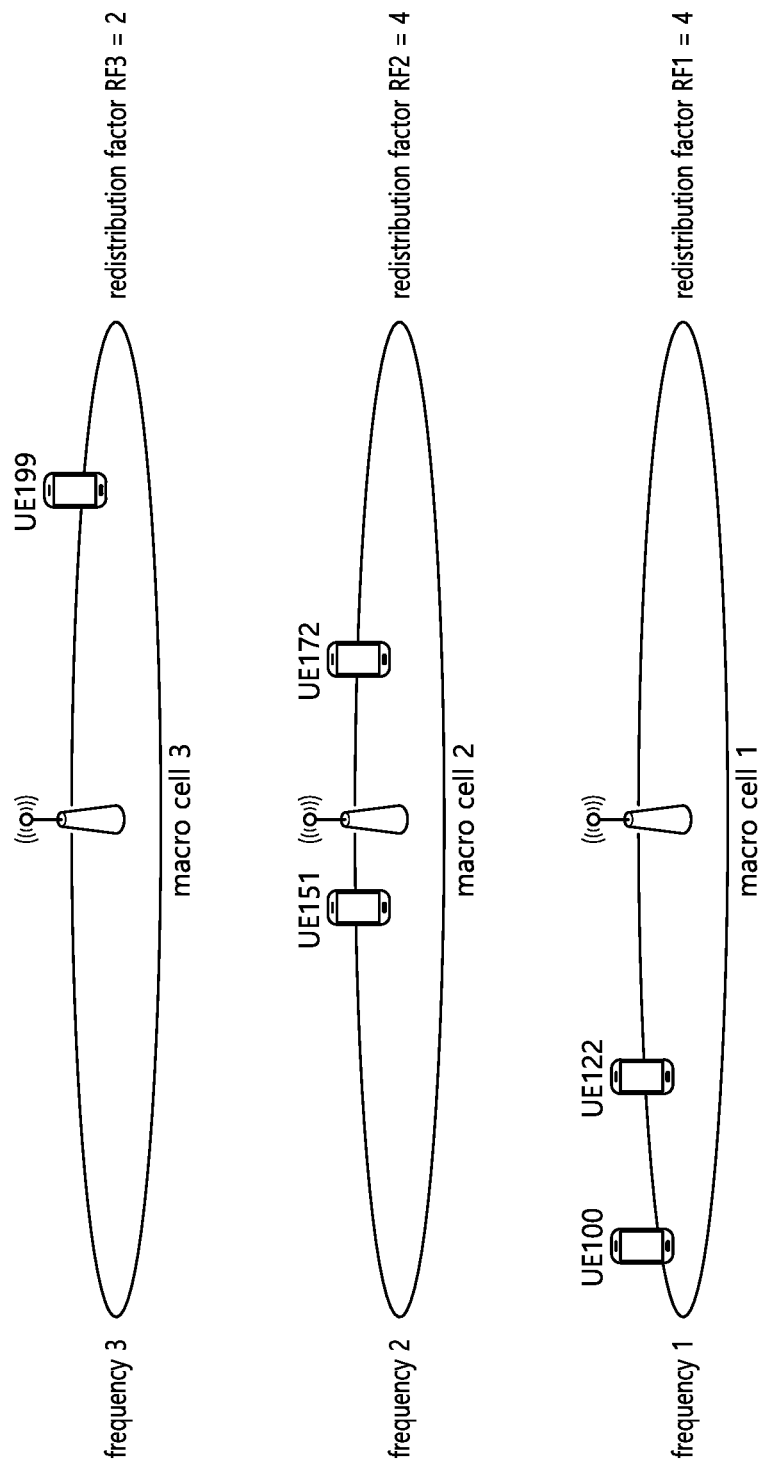
Figure 7C:
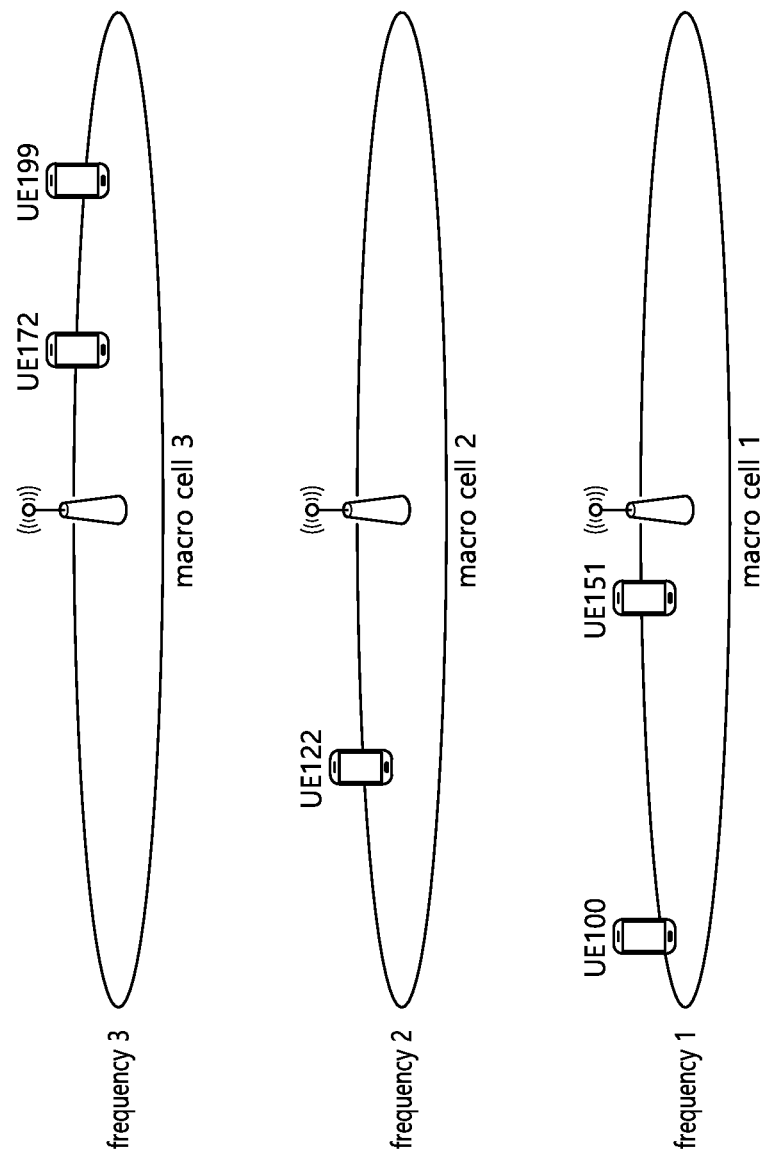

FIG. 7A to FIG. 7C show examples in which a UE performs redistribution based on a newly defined UE_ID according to an embodiment of the present invention. FIG. 7A shows an initial deployment of a UE before redistribution is performed, FIG. 7B shows a deployment of a UE after first redistribution is performed, and FIG. 7C shows a deployment of a UE after second redistribution is performed.

Referring to FIG. 7A, the UE is currently camped on a macro cell 1 on a frequency 1. The UE may be in a state of an RRC_IDLE mode.

Intended distribution statistics is assumed as '50% on a frequency 1, 30% on a frequency 2, and 20% on a frequency 3' in a first redistribution procedure. The intended distribution statistics is assumed as '40% on a frequency 1, 40% on a frequency 2, and 20% on a frequency 3' in a second redistribution procedure. It is assumed that a UE_ID is defined by a function of IMSI and SFN. That is, the UE_ID may be defined by '$(SFN+IMSI) \bmod 100$'. For example, if the UE_ID is defined by '$(a*v\_t+b*v\_id+c) \bmod 100$', v_t may be set to SFN, v_id may be set to IMSI, a and b may be set to 1, and c may be set to 0. For example, if the UE_ID is defined by '[(a*v_t+b*v_id+c) mod 100]+d', v_t may be set to SFN, v_id may be set to IMSI, a and b may be set to 1, and c and d may be set to 0. It is assumed that an SFN value is 0 when a redistribution procedure is triggered. That is, SFN1 is 0. It is assumed that the SFN value is 20 when the redistribution procedure is re-triggered. That is, SFN2 is 20. It is assumed that an IMSI of the UE is 'xyz' for 'UE xyz'. For example, an IMSI of a UE 100 may be 100, an IMSI of a UE 102 may be 102, and an IMSI of a UE 199 may be 199.

1. When a First Redistribution Procedure is Triggered

When the first redistribution procedure having the intended redistribution statistics (50% on the frequency 1, 30% on the frequency 2, and 20% on the frequency 3) is triggered, a UE may perform the following redistribution target selection.

(1) In step S710, a network may broadcast a redistribution parameter. The redistribution parameter may be as follows. In a first macro cell, a redistribution factor RF1 for a serving frequency may be 5. A redistribution factor RF2 for a frequency 2 may be 3. A redistribution factor RF3 for a frequency 3 may be 2. The frequency 2 and the frequency 3 may be an inter-frequency. In a second macro cell, a redistribution factor RF2 for a serving frequency may be 3. A redistribution factor RF1 for a frequency 1 may be 5. A redistribution factor RF3 for a frequency 3 may be 2. The frequency 1 and the frequency 3 may be an inter-frequency. In a third macro cell, a redistribution factor RF3 for a serving cell may be 2. A redistribution factor RF1 for a frequency 1 may be 5. A redistribution factor RF2 for a frequency 2 may be 3. The frequency 1 and the frequency 2 may be an inter-frequency.

(2) In step S720, the UE may perform redistribution target selection. When the UE receives a redistribution parameter and an inter-frequency redistribution procedure is triggered, the redistribution target selection may be performed.

In case of a UE currently camped on a macro cell 1, a sorted list of a valid redistribution factor may be {5, 3, 2} for {frequency 1, frequency 2, frequency 3}. A related redistribution range may be {0.5, 0.3, 0.2} respectively for {frequency 1, frequency 2, frequency 3}. Therefore, if a UE_ID of the UE is greater than or equal to 0 and less than or equal to 50, the UE may choose the frequency 1 as a redistribution target. In addition, if the UE_ID of the UE is greater than 50 and less than or equal to 80, the UE may choose the frequency 2 as the redistribution target. In addition, if the UE_ID of the UE is greater than 80 and less than or equal to 99, the UE may choose the frequency 3 as the redistribution target.

The UE_ID is defined by '(SFN+IMSI) mod 100', and when the redistribution procedure is triggered, the SFN is assumed as 0 (that is, SFN1 is 0). Therefore, the UE_ID may be calculated by 'IMSI mod 100'.

Referring to FIG. 7B, since UE_IDs of the UE 100 to UE 150 are calculated respectively to 0 to 50, the UE 100 to the UE 150 may choose the frequency 1 as a redistribution target. In addition, since UE_IDs of the UE 151 to the UE 180 are calculated respectively to 51 to 80, the UE 151 to the UE 180 may choose the frequency 2 as the redistribution target. In addition, since UE_IDs of the UE 181 to the UE 199 are calculated respectively to 81 to 99, the UE 181 to the UE 199 may choose the frequency 3 as the redistribution target.

2. When a Second Redistribution Procedure is Triggered

After the first redistribution target selection is performed, when the second redistribution procedure having the intended redistribution statistics (40% on the frequency 1, 40% on the frequency 2, and 20% on the frequency 3) is triggered, a UE may perform the following redistribution target selection.

(1) In step S730, a network may broadcast a redistribution parameter. The redistribution parameter may be as follows. In a first macro cell, a redistribution factor RF1 for a serving frequency may be 4. A redistribution factor RF2 for a frequency 2 may be 4. A redistribution factor RF3 for a frequency 3 may be 2. The frequency 2 and the frequency 3 may be an inter-frequency. In a second macro cell, a redistribution factor RF2 for a serving frequency may be 4. A redistribution factor RF1 for a frequency 1 may be 4. A redistribution factor RF3 for a frequency 3 may be 2. The frequency 1 and the frequency 3 may be an inter-frequency. In a third macro cell, a redistribution factor RF3 for a serving cell may be 2. A redistribution factor RF1 for a frequency 1 may be 4. A redistribution factor RF2 for a frequency 2 may be 4. The frequency 1 and the frequency 2 may be an inter-frequency.

(2) In step S740, the UE may perform redistribution target selection. When the UE receives a redistribution parameter and an inter-frequency redistribution procedure is triggered, the redistribution target selection may be performed.

a) In Case of a UE Currently Camped on a Macro Cell 1

A sorted list of a valid redistribution factor may be {4, 4, 2} for {frequency 1, frequency 2, frequency 3}. A related redistribution range may be {0.4, 0.4, 0.2} respectively for {frequency 1, frequency 2, frequency 3}. Therefore, if a UE_ID of the UE is greater than or equal to 0 and less than or equal to 40, the UE may choose the frequency 1 as a redistribution target. In addition, if the UE_ID of the UE is greater than 40 and less than or equal to 80, the UE may choose the frequency 2 as the redistribution target. In addition, if the UE_ID of the UE is greater than 80 and less than or equal to 99, the UE may choose the frequency 3 as the redistribution target.

The UE_ID is defined by '(SFN+IMSI) mod 100', and when the redistribution procedure is triggered, the SFN is assumed as 20 (that is, SFN2 is 20). Therefore, the UE_ID may be calculated by '(20+IMSI) mod 100'.

Referring to FIG. 7C, since UE_IDs of the UE 100 to UE 120 are calculated respectively to 20 to 40, the UE 100 to the UE 120 may choose the frequency 1 as a redistribution target. In addition, since UE_IDs of the UE 121 to the UE 150 are calculated respectively to 41 to 70, the UE 121 to the UE 150 may choose the frequency 2 as the redistribution target.

b) In Case of a UE Currently Camped on a Macro Cell 2

A sorted list of a valid redistribution factor may be {4, 4, 2} for {frequency 2, frequency 1, frequency 3}. A related redistribution range may be {0.4, 0.4, 0.2} respectively for {frequency 2, frequency 1, frequency 3}. Therefore, if a UE_ID of the UE is greater than or equal to 0 and less than or equal to 40, the UE may choose the frequency 2 as a redistribution target. In addition, if the UE_ID of the UE is greater than 40 and less than or equal to 80, the UE may choose the frequency 1 as the redistribution target. In addition, if the UE_ID of the UE is greater than 80 and less than or equal to 99, the UE may choose the frequency 3 as the redistribution target.

The UE_ID is defined by '(SFN+IMSI) mod 100', and when the redistribution procedure is triggered, the SFN is assumed as 20 (that is, SFN2 is 20). Therefore, the UE_ID may be calculated by '(20+IMSI) mod 100'.

Referring to FIG. 7C, since UE_IDs of the UE 151 to UE 162 are calculated respectively to 71 to 80, the UE 151 to the UE 160 may choose the frequency 1 as a redistribution target. In addition, since UE_IDs of the UE 161 to the UE 179 are calculated respectively to 81 to 99, the UE 161 to the UE 179 may choose the frequency 3 as the redistribution target. Since the UE_ID of the UE 180 is calculated to 0, the UE 180 may choose the frequency 2 as the redistribution target.

c) In Case of a UE Currently Camped on a Macro Cell 3

A sorted list of a valid redistribution factor may be {2, 4, 4} for {frequency 3, frequency 1, frequency 2}. A related redistribution range may be {0.2, 0.4, 0.4} respectively for {frequency 3, frequency 1, frequency 2}. Therefore, if a UE_ID of the UE is greater than or equal to 0 and less than or equal to 20, the UE may choose the frequency 3 as a redistribution target. In addition, if the UE_ID of the UE is greater than 20 and less than or equal to 60, the UE may choose the frequency 1 as the redistribution target. In addition, if the UE_ID of the UE is greater than 60 and less than or equal to 99, the UE may choose the frequency 2 as the redistribution target.

The UE_ID is defined by '(SFN+IMSI) mod 100', and when the redistribution procedure is triggered, the SFN is assumed as 20 (that is, SFN2 is 20). Therefore, the UE_ID may be calculated by '(20+IMSI) mod 100'.

Referring to FIG. 7C, since UE_IDs of the UE 181 to UE 199 are calculated respectively to 1 to 19, the UE 181 to the UE 199 may choose the frequency 3 as the redistribution target.

In conclusion, in the embodiments of FIG. 7A to FIG. 7C, when the second redistribution target selection is performed, the UE 100 to the UE 120 and the UE 151 to the UE 160 may be deployed on the frequency 1, the UE 121 to the UE 150 and the UE 180 may be deployed on the frequency 2, and the UE 161 to the UE 179 and the UE 181 to the UE 199 may be deployed on the frequency 3.

Although it is described for convenience of explanation in the embodiments of FIG. 7A to FIG. 7C that the UE_ID is defined by a function of IMSI and SFN, the present invention is not limited thereto. The UE_ID may be defined variously on the basis of at least one of a time varying index, a UE identity, and a constant value.

Figure 8A:
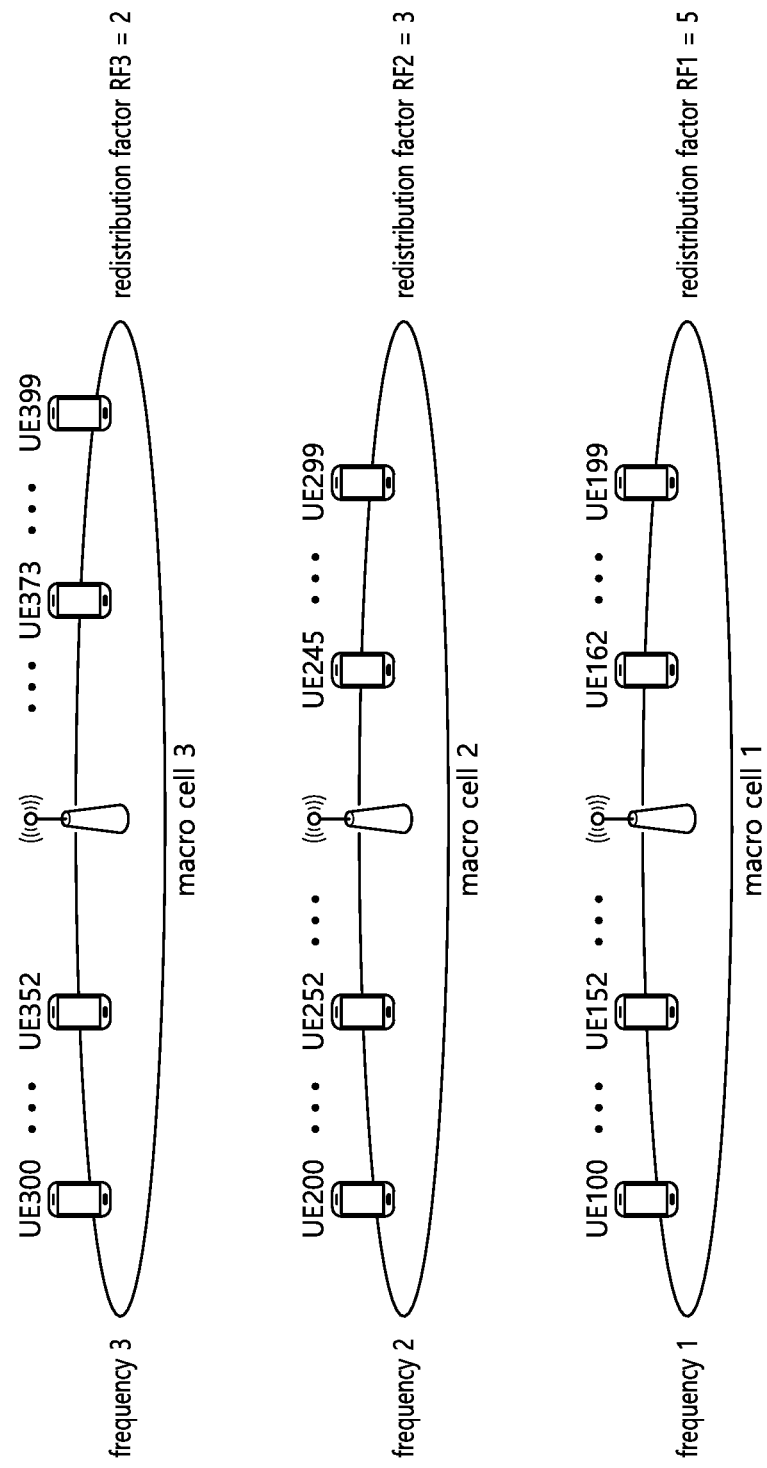
FIG. 8A and FIG. 8B show examples in which a UE performs redistribution based on a newly defined UE_ID according to an embodiment of the present invention.
Figure 8B:
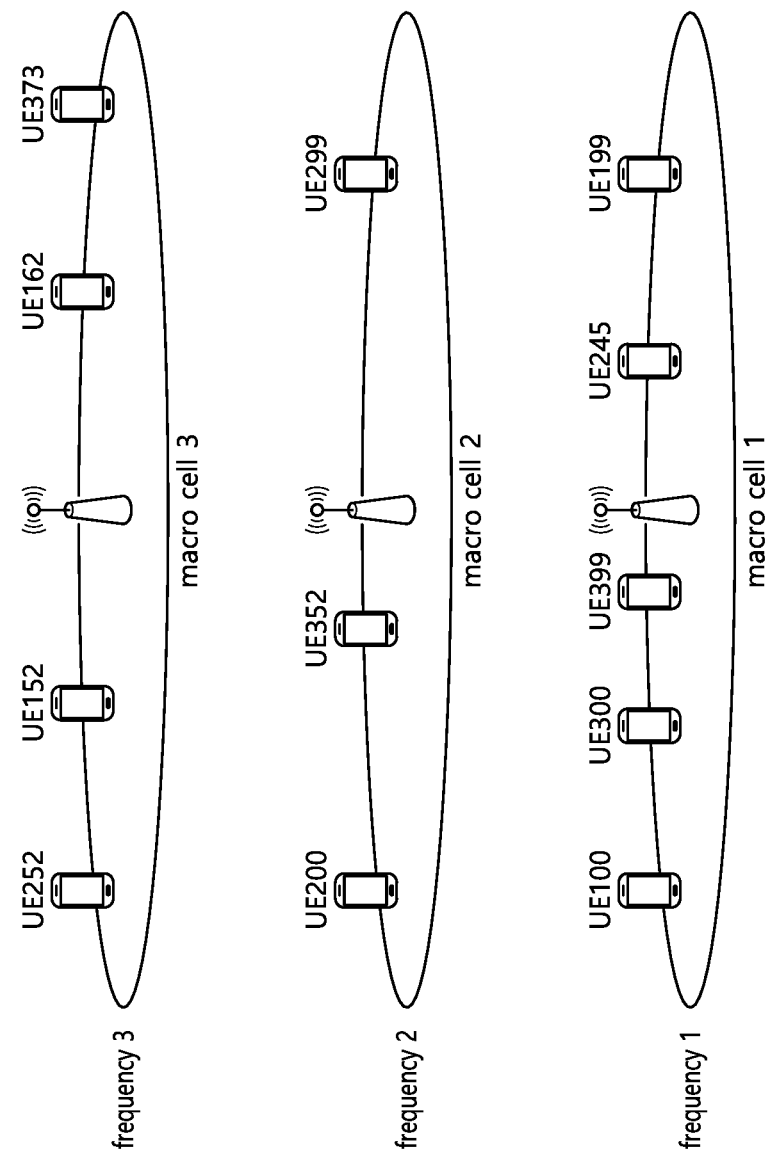

FIG. 8A and FIG. 8B show examples in which a UE performs redistribution based on a newly defined UE_ID according to an embodiment of the present invention. FIG. 8A shows an initial deployment of a UE before redistribution is performed, and FIG. 8B shows a deployment of a UE after first redistribution is performed.

Referring to FIG. 8A, a UE 100 to a UE 199 are currently camped on a macro cell 1 on a frequency 1, a UE 200 to a UE 299 are currently camped on a macro cell 2 on a frequency 2, and a UE 300 to a UE 399 are currently camped on a macro cell 3 on a frequency 3. The UE may be in a state of an RRC_IDLE mode.

Intended distribution statistics is assumed as '50% on frequency 1, 30% on frequency 2, and 20% on frequency 3'. The UE_ID may be defined by '(3*SFN+IMSI) mod 100'. It is assumed that the SFN is 10 when a redistribution procedure is triggered. It is assumed that IMSI of the UE is 'xyz' for 'UE xyz'. When the redistribution procedure having the intended redistribution statistics is triggered, the UE may perform the redistribution target selection as follows.

In step S810, a network may broadcast a redistribution parameter.

In step S820, the UE may perform redistribution target selection. When the UE receives the redistribution parameter and an inter-frequency redistribution procedure is triggered, the redistribution target selection may be performed.

In case of a UE currently camped on a macro cell 1, a sorted list of a valid redistribution factor may be {5, 3, 2} for {frequency 1, frequency 2, frequency 3}. A related redistribution range may be {0.5, 0.3, 0.2} respectively for {frequency 1, frequency 2, frequency 3}. UE_ID may be calculated by '(3*SFN+IMSI) mod 100'. The SFN is 10. Referring to FIG. 8B, since UE_IDs of the UE 170 to the UE 199 and the UE 100 to the UE 120 are calculated respectively to 0 to 50, the UE 170 to the UE 199 and the UE 100 to the UE 120 may choose the frequency 1 as a redistribution target. In addition, since UE_IDs of the UE 121 to the UE 150 are calculated respectively to 51 to 80, the UE 121 to the UE 150 may choose the frequency 2 as the redistribution target. In addition, since UE_IDs of the UE 151 to the UE 169 are calculated respectively to 81 to 99, the UE 151 to the UE 169 may choose the frequency 3 as the redistribution target.

In case of a UE currently camped on a macro cell 2, a sorted list of a valid redistribution factor may be {3, 5, 2} for {frequency 2, frequency 1, frequency 3}. A related redistribution range may be {0.3, 0.5, 0.2} respectively for {frequency 2, frequency 1, frequency 3}. UE_ID may be calculated by '(3*SFN+IMSI) mod 100'. The SFN is 10. Referring to FIG. 8B, since UE_IDs of the UE 200 and the UE 270 to the UE 299 are calculated respectively to 0 to 30, the UE 200 and the UE 280 to the UE 299 may choose the frequency 2 as the redistribution target. In addition, since UE_IDs of the UE 201 to the UE 250 are calculated respectively to 31 to 80, the UE 201 to the UE 250 may choose the frequency 1 as the redistribution target. In addition, since UE_IDs of the UE 251 to the UE 269 are calculated respectively to 81 to 99, the UE 251 to the UE 269 may choose the frequency 3 as the redistribution target.

In case of a UE currently camped on a macro cell 3, a sorted list of a valid redistribution factor may be {2, 5, 3} for {frequency 3, frequency 1, frequency 2}. A related redistribution range may be {0.2, 0.5, 0.3} respectively for {frequency 3, frequency 1, frequency 2}. UE_ID may be calculated by '(3*SFN+IMSI) mod 100'. The SFN is 10. Referring to FIG. 8B, since UE_IDs of the UE 370 to the UE 390 are calculated respectively to 0 to 20, the UE 370 to the UE 390 may choose the frequency 3 as the redistribution target. In addition, since UE_IDs of the UE 300 to the UE 340 and the UE 391 to the UE 399 are calculated respectively to 21 to 70, the UE 300 to the UE 340 and the UE 391 to the UE 399 may choose the frequency 1 as the redistribution target. In addition, since UE_IDs of the UE 341 to the UE 369 are calculated respectively to 71 to 99, the UE 341 to the UE 369 may choose the frequency 2 as the redistribution target.

In conclusion, when the redistribution procedure is triggered, the UE may be redistributed as shown in Table 4.

TABLE 4

| macro cell 1 | macro cell 2 | macro cell 3 |
|---|---|---|
| UE 100~UE 120 and UE 170~UE 199 | UE 121~UE 150 | UE 151~UE 169 |
| UE 201~UE 250 | UE 200 and UE 270~UE 299 | UE 251~UE 269 |
| UE 300~UE 340 and UE 391~UE 399 | UE 341~UE 369 | UE 370~UE 390 |

When redistribution is performed based on the proposed UE_ID, a problem in that a specific UE cannot choose a cell or a frequency other than a serving cell or a serving frequency can be solved.

Figure 9:
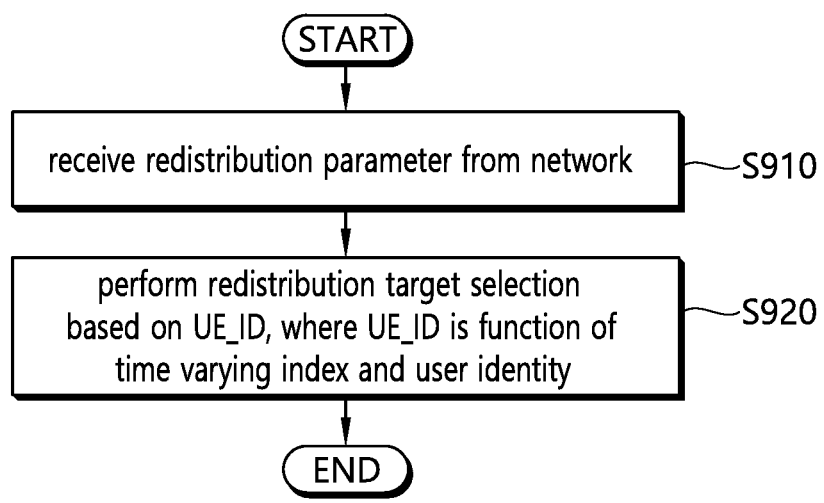
FIG. 9 is a block diagram showing a method of performing redistribution target selection by a UE according to an embodiment of the present invention.

FIG. 9 is a block diagram showing a method of performing redistribution target selection by a UE according to an embodiment of the present invention.

Referring to FIG. 9, in step S910, a UE may receive redistribution parameters from a network. The redistribution parameter may include a redistribution factor of a serving frequency and a neighboring frequency. The UE may be in a state of an RRC_IDLE mode.

In step S920, the UE may perform the redistribution target selection on the basis of a UE_ID. The UE_ID may be a function of a time varying index and a user identity (or UE identity).

The time varying index may be any one of SFN (System Frame Numbers) and HSFN (Hyper SFN).

The user identity is any one of IMSI (International Mobile Subscriber Identity), C-RNTI (Cell Radio Network Temporary Identifier), and S-TMSI (System Architecture Evolution (SAE) Temporary Mobile Subscriber Identity). The SFN may indicate a system frame number when a redistribution procedure is triggered.

The UE_ID may be defined by: UE_ID=(a*time varying index+b*user identity+c) mod 100, where a, b, and c are any constants.

The UE_ID may be defined by: UE_ID=[(a*time varying index+b*user identity+c) mod 100]+d, where a, b, c, and d are any constants.

The redistribution target selection may be performed when a redistribution procedure is triggered.

Figure 10:
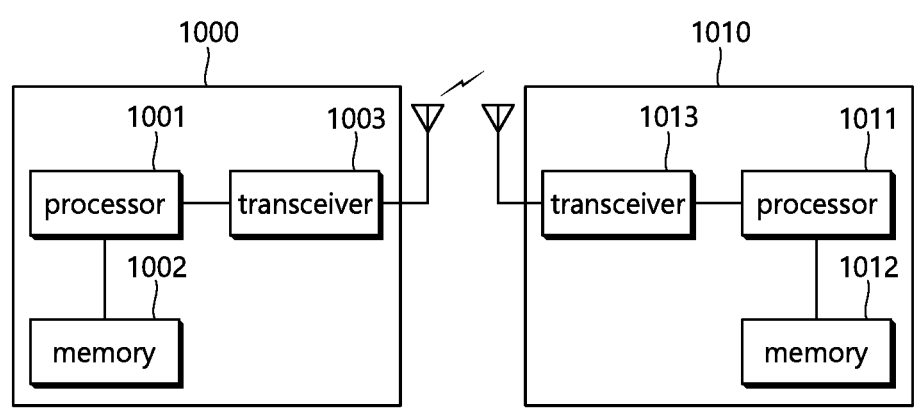
FIG. 10 is a block diagram illustrating a wireless communication system according to the embodiment of the present invention.

FIG. 10 is a block diagram illustrating a wireless communication system according to the embodiment of the present invention.

A BS 1000 includes a processor 1001, a memory 1002 and a transceiver 1003. The memory 1002 is connected to the processor 1001, and stores various information for driving the processor 1001. The transceiver 1003 is connected to the processor 1001, and transmits and/or receives radio signals. The processor 1001 implements proposed functions, processes and/or methods. In the above embodiment, an operation of the base station may be implemented by the processor 1001.

A UE 1010 includes a processor 1011, a memory 1012 and a transceiver 1013. The memory 1012 is connected to the processor 1011, and stores various information for driving the processor 1011. The transceiver 1013 is connected to the processor 1011, and transmits and/or receives radio signals. The processor 1011 implements proposed functions, processes and/or methods. In the above embodiment, an operation of the UE may be implemented by the processor 1011.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of performing redistribution target selection by a user equipment (UE) in a wireless communication system, the method comprising:
    receiving redistribution parameters from a network; and
    performing the redistribution target selection based on a UE_ID,
    wherein the UE_ID is obtained by:

$$UE\_ID=[(a*\text{time varying index}+b*\text{user identity}+c) \bmod 100]+d,$$

wherein a, b, c, and d are any constants,
    wherein the time varying index includes at least one of system frame number (SFN) or hyper system frame number (HSFN), and
    wherein the user identity includes at least one of international mobile subscriber identity (IMSI), cell radio network temporary identifier (C-RNTI), or system architecture evolution (SAE) temporary mobile subscriber identity (S-TMSI).

2. The method of claim 1, wherein the SFN indicates a system frame number when a redistribution procedure is triggered.

3. The method of claim 1, wherein the redistribution target selection is performed when a redistribution procedure is triggered.

4. The method of claim 1, wherein the redistribution parameter includes a redistribution factor of a serving frequency and a neighboring frequency.

5. The method of claim 1, wherein the UE is in a state of an RRC_IDLE mode.

6. A user equipment (UE) for performing redistribution target selection in a wireless communication system, the UE comprising:
    a memory;
    a transceiver, and
    a processor operatively coupled to the memory and the transceiver,
    wherein the processor is configured to:
        control the transceiver to receive redistribution parameters from a network; and perform the redistribution target selection based on a UE_ID, wherein the UE_ID is obtained by:

$$UE\_ID=[(a*\text{time varying index}+b*\text{user identity}+c) \bmod 100]+d,$$

wherein a, b, c, and d are any constants, wherein the time varying index includes at least one of system frame number (SFN) or hyper system frame number (HSFN), and wherein the user identity includes at least one of international mobile subscriber identity (IMSI), cell radio network temporary identifier (C-RNTI), or system architecture evolution (SAE) temporary mobile subscriber identity (S-TMSI).

\* \* \* \* \*